(12) United States Patent
Shipman, Jr. et al.

(10) Patent No.: US 9,742,935 B1
(45) Date of Patent: *Aug. 22, 2017

(54) MAIL PROCESSING AND DELIVERY WITHIN A CONTROLLED-ENVIRONMENT FACILITY

(71) Applicant: Tech Friends, Inc., Jonesboro, AR (US)

(72) Inventors: Bobby L. Shipman, Jr., Jonesboro, AR (US); Mark A. Haney, Jonesboro, AR (US)

(73) Assignee: TECH FRIENDS, INC., Jonesboro, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,378

(22) Filed: Apr. 12, 2016

Related U.S. Application Data (63) Continuation-in-part of application No. 14/511,904, filed on Oct. 10, 2014, now Pat. No. 9,311,627.

(51) Int. Cl.
| | |
|---|---|
| G06K 15/00 | (2006.01) |
| H04N 1/00 | (2006.01) |
| H04L 12/58 | (2006.01) |
| G06K 9/00 | (2006.01) |
| G06F 3/12 | (2006.01) |

(52) U.S. Cl.
CPC ..... *H04N 1/00241* (2013.01); *G06K 9/00469* (2013.01); *H04L 51/22* (2013.01); *H04N 2201/0081* (2013.01)

(58) Field of Classification Search
CPC .... G06Q 10/107; G06Q 50/10; G06F 3/1204; G06F 3/1218; G06F 3/1222; G06F 17/30073; G06F 17/30117; H04N 1/00241; H04N 151/22; H04N 2201/0081; G06K 9/00469
USPC .......................................... 358/1.1–1.18, 402
See application file for complete search history.

(56) References Cited

U.S. PATENT DOCUMENTS

| | | | |
|---|---|---|---|
| 6,727,998 B1 * | 4/2004 | Tomiyasu | H04L 12/58 358/1.15 |
| 9,311,627 B1 * | 4/2016 | Shipman, Jr. | G06Q 10/107 |
| 2003/0074477 A1 * | 4/2003 | Fukushima | H04L 12/5835 709/246 |
| 2004/0205137 A1 * | 10/2004 | Chen | H04L 12/58 709/206 |
| 2011/0066281 A1 * | 3/2011 | Ksiazek | B07C 3/12 700/224 |
| 2014/0229558 A1 * | 8/2014 | Ricci | H04L 51/38 709/206 |

* cited by examiner

*Primary Examiner* — Gabriel Garcia
(74) *Attorney, Agent, or Firm* — Fogarty LLP (57) ABSTRACT

An incoming physical mail item addressed to a resident of a controlled-environment facility is converted to a digital format mail item, which is associated with the resident and archived in an electronic database. A determination may be made whether the resident is allowed to receive the physical mail item. If so, the digital format mail item may be delivered to the resident as an electronic message, if an electronic message service is available to the resident.

39 Claims, 5 Drawing Sheets

MAIL PROCESSING AND DELIVERY WITHIN A CONTROLLED-ENVIRONMENT FACILITY

CROSS-REFERENCE TO RELATED APPLICATION

This is a continuation in part of, and claims benefit of, U.S. patent application Ser. No. 14/511,904, also entitled Mail Processing and Delivery Within a Controlled-Environment Facility, filed Oct. 10, 2014, which issued as U.S. Pat. No. 9,311,627 on Apr. 12, 2016, and which is hereby incorporated herein by reference.

TECHNICAL FIELD

This specification relates generally to processing of incoming mail to residents of controlled-environment facilities, more particularly to converting such mail to a digital format, and specifically to delivering such mail within a controlled-environment facility, such as through use of existing delivery infrastructure for other goods or services such as email, commissary, medical, library, or the like.

BACKGROUND

Residents of controlled-environment facilities, such as inmates in county, state and federal correctional facilities, are typically permitted to send and receive mail via the postal service. The processing of this "snail mail" represents a significant financial and labor burden, as all letters must be inspected for contraband, inappropriate language content and hidden messages. Moreover, the letters must be sorted by individual housing unit and distributed to the individual residents.

The distribution of mail to residents of a controlled-environment facility is also an extremely costly and labor-intensive activity. For every piece of mail received at the facility, a facility official must look up the resident associated with the correspondence, determine whether the resident is allowed to receive correspondence at all and/or determine whether the resident is allowed to receive the correspondence from the individual who sent it, sort the mail for delivery based on resident housing assignment, and then spend hours delivering the mail throughout the facility. Since this is a daily activity, it demands substantial facility resources to accomplish the task. Further, mail that arrives at a correctional facility via the postal service is often contaminated, such as with a biohazard. The personnel who are responsible for opening, examining, reading and sorting the mail are often necessarily equipped with gloves and masks to prevent infection. This aspect of the job affects personnel recruitment and retention.

In a correctional facility situation, inmate mail can also be a source of intelligence with respect to criminal investigations, and the like. For this reason, archiving of correspondence would be helpful, but the practice is not widespread due to cost (e.g., scanning, maintenance of storage media, etc.).

Electronic correspondence is now being permitted in some correctional facilities. There are several variants on this process. In some locations, inmates have access to computers and can send and receive electronic messages in a manner similar to traditional email. In other locations, electronic messages, such as sent by friends and family, are reviewed and printed for hardcopy distribution. Inmates may be allowed to respond to the inbound messages by submitting a hardcopy message that is scanned and transmitted to an outside recipient. The systems and processes needed for managing electronic and traditional "snail mail" correspondence are typically very different and often require duplication of effort.

Residents of controlled-environment facilities, such as inmates, are often permitted to purchase food and clothing items through what is typically referred to as "commissary." These items may be offered through one or more point-of-sale (POS) walk-up windows or "stores" in a facility or may be ordered in advance and delivered by a designated commissary provider. The personnel that prepare the commissary packages are subject to background checks and are monitored to prevent contraband introduction into the facility in this manner. Prior to distribution, the orders are inspected by facility staff for potential contraband and sorted by housing unit.

SUMMARY

The present invention is directed to systems and methods, which provide for mail processing and delivery via controlled-environment facility networks, and the like. In accordance with embodiments of the present systems and methods, an incoming physical mail item addressed or directed to a resident of a controlled-environment facility is received and converted, such as by a processor controlled digital imaging device, to a digital format mail item. However, prior to converting the physical mail item to a digital format mail item, the physical mail item may be opened and inspected. The digital format mail item may then be associated with the resident, by the one or more processor-based computer systems, or similar means. A copy of the digital format mail item, as associated with the resident is archived in an electronic database by the one or more processor-based computer systems, which may be operatively coupled thereto. Also, statistics related to the digital format mail item may be maintained in this or another electronic database, and these statistics may be made available for reporting in accordance with various embodiments of the present systems and methods. Also, in accordance with some embodiments of the present systems and methods, the identity of a person operating a processor controlled digital imaging device used to scan the physical mail item may be recorded in the same or another electronic database. Various embodiments of the present systems and methods may also call for converting an envelope of the incoming physical mail item into a digital format and associating the digital format of the envelope with the digital mail item.

In accordance with some embodiments of the present systems and methods, the digital format mail item may then be printed by one or more processor-based computer systems and a resulting printed mail item may be distributed or otherwise provided to the resident. Distribution or provision of the printed digital format mail item may be via a commissary provisioning system in accordance with various embodiments of the present systems and methods. Alternatively printing and distribution or provision of the printed digital format mail item may be via printing of the digital format mail item at a printing station located in close proximity to resident housing, meal, recreation, or common areas of the controlled-environment facility, or printing of the digital format mail item at a self-service printing station kiosk operated by the resident of the controlled-environment facility.

In accordance with embodiments of the present systems and methods, a determination may be made whether an electronic message service is available to the resident and the digital format mail item may be delivered to the resident as an electronic message if an electronic message service is available to the resident. Conversely, the digital format mail item may be printed for delivery to the resident via a commissary provisioning system if an electronic message service is not available to the resident. However, prior to any such delivery, the one or more processor-based computer systems may also determine whether the resident is allowed to receive the physical mail item, and/or the digital format mail item.

In accordance with embodiments of the present systems and methods, delivering the digital format mail item to the resident as an electronic message and/or printing of the digital format mail item for delivery to the resident via a commissary provisioning system may only be carried out in response to a determination that the resident is allowed to receive the physical mail item. A determination whether the resident is allowed to receive the physical mail item may, in some embodiments, include determining an identity of a sender of the physical mail item using character recognition (such as on the digital mail item), comparing the identity of the sender to a list of approved contacts for the resident, and delivering the digital format mail item upon determination that the resident is allowed to receive communications from the sender. In accordance with various embodiments of the present systems and methods, the digital format mail item may be presented to a controlled-environment facility officer for review and approval before delivering the digital format mail item to the resident as an electronic message. Also, the digital format mail item may be (automatically) translated into another language and a resulting translated digital format mail item may be checked against keywords in the other language.

Delivery of the digital format mail item to the resident may comprise providing the electronic message directed to the resident from a centralized server outside of the controlled-environment facility. A date and time the digital format mail item is viewed by the resident, and/or the like, may be recorded in some embodiments. In accordance with some embodiments of the present systems and methods, the digital format mail item may be encrypted prior to delivery. In such embodiments, a viewer's identity used to decrypt the item, and the date and/or the time of each decryption and viewing of the digital format mail item may be recorded. Some embodiments may allow rescinding delivery of the digital format mail item, such as at a future time, after the delivery.

Controlled-environment facility policy and/or procedures may be applied to the digital format mail item and/or the physical mail item in response to a determination that the resident is not allowed to receive the physical mail item. For example, if the resident is not allowed to receive the physical mail item, the controlled-environment facility policy and/or procedures may call for deleting the digital format mail item and/or destroying the physical mail item.

In accordance with various embodiments of the present systems and methods, printing and delivery via a commissary provisioning system may comprise printing the digital format mail item at a commissary Point of Sale (POS) within the controlled-environment facility. In such embodiments an identity of the resident may be confirmed and the digital format mail item may only be printed in response to confirming an identity of the resident. Such confirmation of the identity of the resident may include scanning an identification bracelet worn by the resident, or the like. Printing and delivery via a commissary provisioning system, in accordance with various other embodiments of the present systems and methods, may comprise printing the digital format mail item, including the resulting printed mail item in a commissary order for the resident, and delivering the commissary order that includes the printed mail item to the resident at the controlled-environment facility. In such embodiments, printing the digital format mail item may be carried out in response to scanning of a commissary order form of the resident. Under these embodiments if it is determined that a mail item is addressed to a resident that does not have a commissary order, an (empty) commissary delivery may be created for the resident, the printed mail item may be included as a commissary delivery for the resident, and the printed mail item may be delivered to the resident, as a commissary delivery, at the controlled-environment facility. In some embodiments, a controlled-environment facility officer may be provided an opportunity to print the digital format mail item.

In accordance with some embodiments of the present systems and methods a website may provide tracking of delivery status of mail items, and/or the like.

In accordance with embodiments of the present systems and methods, the controlled-environment facility may be a correctional facility and the resident may be an inmate of the correctional facility. However, in other embodiments the controlled-environment facility may be a hospital, nursing home, camp, military facility, or any other controlled-environment facility, while the resident may, be a patient, camper, soldier, or other corresponding controlled-environment facility resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processors, wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale. The accompanying drawings, which are incorporated in and form part of the specification in which like numerals designate like parts, illustrate embodiments of the present invention and together with the description, serve to explain the principles of the invention. In the drawings:

DETAILED DESCRIPTION

The invention now will be described more fully hereinafter with reference to the accompanying drawings. In particular, embodiments of the present systems and methods may be described below with respect to specific types of controlled-environment facilities, such as a correctional facility, prison, jail, or the like. This invention may, however, be embodied in many different forms and should not be construed as limited to the embodiments set forth herein. As but one example the controlled-environment facility may be a hospital, and the resident a patient. A still further example may be where the controlled-environment facility is a camp, and the resident campers. The discussed embodiments are provided so that this disclosure will be thorough and complete, and will fully convey the scope of the invention to those skilled in the art. One skilled in the art may be able to use the various embodiments of the invention.

This specification describes example embodiments for processing incoming mail to residents of a controlled-environment facility, such as by converting such mail to a digital format and providing an electronic or printed copy of the digital mail item to the resident within the controlled-environment facility. For example, embodiments call for delivering a digitized mail item via email or delivering printed digital mail items employing existing infrastructure for delivery of other goods or services, such as commissary, medical, library books, or the like. In accordance with embodiments of the present systems and methods, an incoming physical mail item addressed to a resident of a controlled-environment facility is converted to a digital format mail item, which is associated with the resident and archived in an electronic database. A determination may be made whether the resident is allowed to receive the physical mail item. If so, the digital format mail item may be delivered to the resident as an electronic message if an electronic message service is available to the resident. If not, the digital format mail item is printed to be distributed or other wise provided to the resident, such as via a commissary provisioning system, at a local print station within the controlled-environment facility, or the like. Print and delivery via a commissary provisioning system may be made at a commissary point of sale within the controlled-environment facility, or a printed digital format mail item may be included in a commissary order for the resident, and delivered to the resident at the controlled-environment facility with the resident's commissary order. Hence, the present systems and methods may combine electronic and traditional mail into a single, comprehensive system that leverages the most appropriate distribution network within the framework of a controlled-environment facility's current operations.

Figure 1:
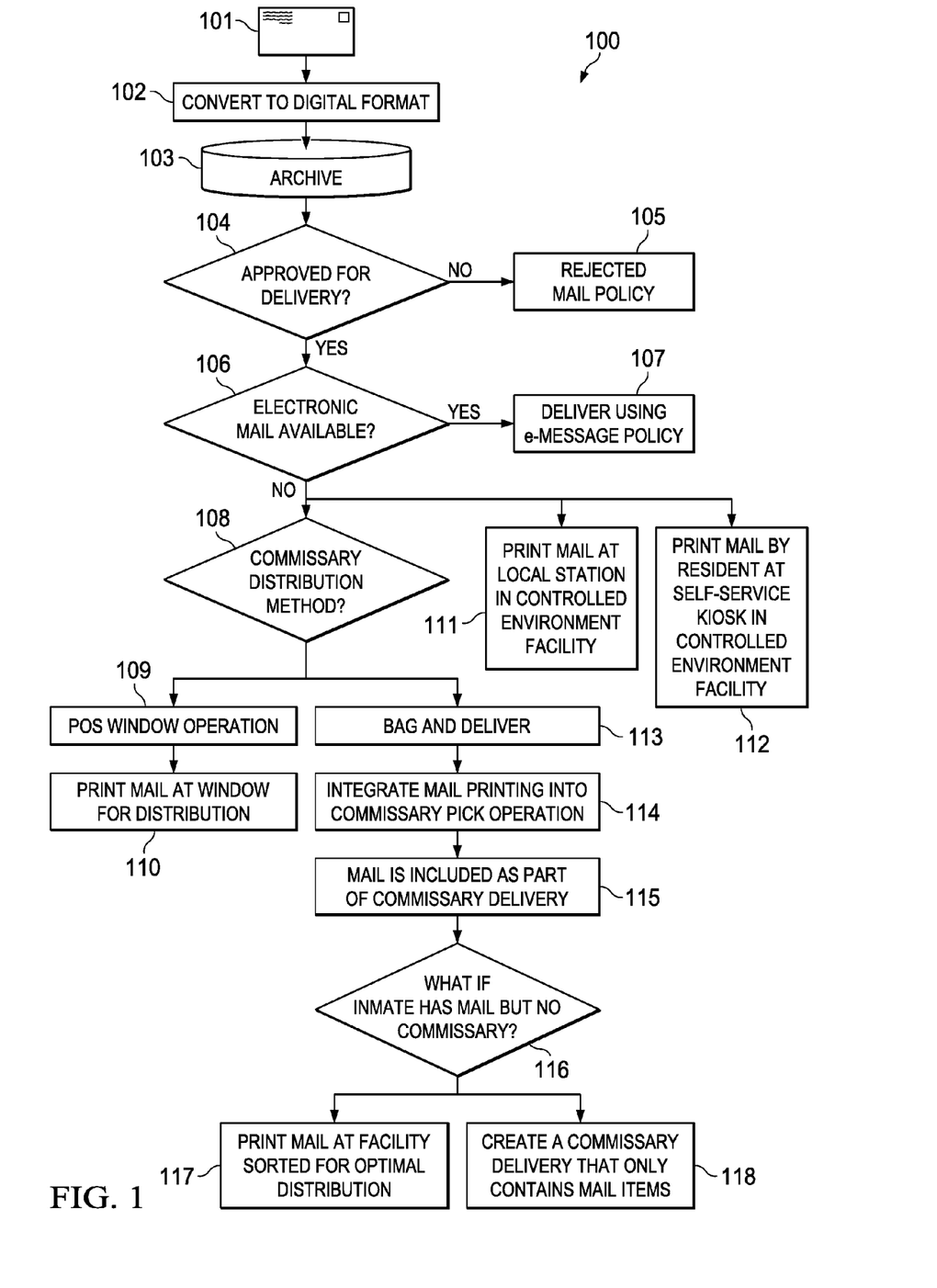
FIG. 1 is a diagrammatic flowchart of an example procedure for mail processing and delivery via controlled-environment facility commissary networks, in accordance with at least one embodiment.

FIG. 1 is a diagrammatic flowchart of example procedure 100 for mail processing and delivery via controlled-environment facility commissary networks, in accordance with at least one embodiment. As discussed in greater detail below, process 100, or at least various steps thereof, may be carried out by the controlled-environment facility, or by an outside vendor employing policies and procedures of the controlled-environment facility. Processing centers, or the like, may be implemented for large institutions such as Departments of Corrections, in accordance with various embodiments of the present systems and methods centralized mail processing, which may result in significant cost savings, integration of investigative efforts, etc.

In various embodiments of process 100, letter 101 sent via the postal service, UPS, Federal Express or other physical mail carrier to a designated address for delivery to a controlled environment facility resident, such as a letter mailed to an inmate of a correctional institution by a friend or family member, is converted to a digital format and associated with the resident at 102. This conversion may be carried out by scanning the letter, taking a digital image (photograph) of the letter, and/or the like. The digital format may be a "direct" image file, such as JPEG, TIFF, PNG, or the like. Additionally or alternatively, the digital format may be a "locked" searchable file, such as a text PDF file, or the like, which may be derived through performing an Optical Character Recognition (OCR) operation on an image file resulting from an optical scan of the letter. Further, the digital format may alternatively or additionally be a fully editable and/or annotatable document, which may again be derived from OCR operations on an image file resulting from an optical scan of the letter.

In accordance with various embodiments, information that the facility typically tracks in association with a letter, in accordance with the facility's policies and procedure, and/or information that the facility wishes to track employing the present systems and methods, may be included and/or associated with the digital file (e.g., sender name, sender address, etc.). For example, statistics related to the digital format mail item may be maintained in an electronic database, and these statistics may be made available for reporting in accordance with various embodiments of the present systems and methods. As a particular example, statistics about the digital format mail item, such as number of messages, frequency of correspondence, zip codes, word frequency, etc. may be maintained and made available for reporting. In accordance with some embodiments of the present systems and methods, the identity of a person operating a processor controlled digital imaging device used to scan the physical mail item may be archived as well, such as for potential investigative, quality control purposes, and/or the like. Various embodiments of the present systems and methods may also call for converting an envelope of the incoming physical mail item into a digital format and associating the digital format of the envelope with the physical mail item's contents, such as the digital mail item text. At 103, the digital rendering and any associated statistics or other information, may be saved in an archive.

At 104, the digital rendering is subjected to the facility's approval process, such as may be part of the aforementioned facility's policies and procedures. For example, a determination may be made at 104 whether the resident is allowed to receive correspondence at all, whether the resident is allowed to receive the particular correspondence from the individual who sent it, a disciplinary status of the resident, and/or the like. In such an example, the determination may be whether the resident is allowed to receive the physical mail item, and may, in some embodiments, include determining an identity of a sender of the physical mail item using character recognition (such as on the digital mail item and/or envelope), comparing the identity of the sender to a list of approved contacts for the resident, and only delivering the digital format mail item upon determination that the resident is allowed to receive communications from the sender. In accordance with assorted embodiments of the present systems and methods, pictures or images within the mail correspondence may be processed to determine if they contained nudity or other offensive material. Pictures may be delivered based on this determination or blurred by region to make them acceptable, in accordance with some embodiments. In accordance with some embodiments the mail may be automatically filtered or modified to remove offensive language or symbols before delivery to the resident. The scanned mail can also be subjected to Optical Marking Recognition (OMR) and/or keyword searching. For example, object recognition algorithms may be employed to determine if gang symbols or other coded material existed on the pages.

In accordance with investigative implementations employing embodiments of the present systems and methods, analysis may be performed on mail correspondence to identify, and/or confirm the identity of, the outside party based on handwriting, word choice, grammar, punctuation, spelling, capitalization, word frequency, or other criteria. In accordance with investigative implementations employing embodiments of the present systems and methods, alerts may be generated based on rules established by the facility whenever a particular inmate receives correspondence, when certain keywords are flagged in received correspondence during a review, such as at 104, whenever a particular outside person sends mail, etc. Mail statistics can be integrated into a larger investigative tool tracking an inmate's associations based on mail correspondence, which may be further correlated with other information such as telephone usage, deposits, etc. When coupled with naïve Baysian filter, artificial intelligence system, or similar data mining tool, the present systems and methods may be used, such as in investigative embodiments or facility management embodiments to identify certain resident characteristics based on the content of mail correspondence such as gang affiliation, suicidal tendencies, escape risk, etc.

The digital format mail item may be (automatically) translated into another language and a resulting translated digital format mail item may be checked against keywords in the other language, in accordance with embodiments of the present systems and methods at 104, or later. That is, as but one example (applicable to American correctional facilities) the message may be automatically translated from one (non-English) language (e.g. Spanish, Farsi, Arabic, Russian, etc.) to another language (e.g. English) and checked against keywords in the language it is being converted to (i.e. English).

In accordance with various embodiments of the present systems and methods, the digital format mail item may additionally or alternatively be presented to a controlled-environment facility officer for review and approval before delivering the digital format mail item to the resident. For example, an officer may be required to review and approve the digital format mail item before the resident is allowed to view the digital format mail item.

Hence, whether or not the mail message is rejected at 104, application of controlled-environment facility policy and/or procedures to the digital format mail item and/or the physical mail item may result in creating alerts to staff of the controlled-environment facility, identification of characteristics of the resident for investigative purposes, censoring disallowed images or words in the mail message, enforcing limits on the number of mail messages delivered to a resident over a given period of time, routing of the digital format mail item to a controlled-environment staff member for review, and/or the like.

Regardless, at 104 a determination may be made as to whether the mail message is either approved or rejected. If rejected, normal facility policy for rejected mailings may be followed at 105. For example, the digital file may be erased and the original physical correspondence destroyed, the digital file and/or the original physical correspondence may be turned over to an investigative body or agency, the digital file and original physical correspondence may be archived for later distribution to the resident such as after a disciplinary period or upon the resident's release, or similar action may be taken with the digital file and/or original physical correspondence.

However, if approved at 104, the mail message may be delivered through electronic means, if available. For example, a determination may be made at 106 whether electronic mail delivery is available for the receiving resident, and if it is, the mail message may be delivered to the resident at 107, in a manner prescribed by the resident's facility. Some controlled-environment facilities allow residents access to electronic messaging, such as emails via a digital distribution network of some sort. For example, kiosks disposed in correctional facility cellblocks or pods may provide inmates various means of communication such as telephone, video phone, email access, web access, or the like. Alternatively or additionally, some correctional facilities allow inmates to have tablet computing devices or the like specifically adapted or approved for use in the facility, which may be used to access email, the Internet, text messages, or the like. Thus, in accordance with embodiments of the present systems and methods, the mail may be automatically routed to an electronic device accessible by the resident to read the correspondence, and to reply, as permitted. In accordance with some embodiments, it may be advantageous to convert a resident's digital reply, such as a reply email, to regular mail for delivery through the postal service.

In accordance with embodiments of the present systems and methods, this delivery of the digital format mail item to the resident at 107 may comprise providing the electronic message directed to the resident from a centralized server outside of the controlled-environment facility. That is, the digital format mail items may be displayed on the aforementioned kiosk and/or tablet device, to the resident, from a centralized server, which is not located within the controlled-environment facility.

A date and time the digital format mail item is viewed by the resident, and/or the like, may be recorded in some embodiments, for potential investigative, and/or quality control purposes, and/or the like. In accordance with such embodiments, or the like, the digital format mail item may be encrypted prior to delivery. In such embodiments, a viewer's identity used to decrypt the item, and the date and/or the time of each decryption and viewing of the digital format mail item may be recorded, such as for later potential investigative purposes, and/or the like.

Some embodiments may allow rescinding delivery of the digital format mail item, such as at a future time, after delivery at 107. This affords an ability to remove the message from the resident upon determination it was delivered to the wrong resident, as a disciplinary measure, or the like.

Conversely, if at 106 it is determined electronic mail, or the like, is not available for the recipient resident, distribution of a printed copy of the digital format mail item to the resident, within the controlled-environment facility, may be carried out. For example, delivery of the mail message may be incorporated into a commissary delivery network at 108, in accordance with various embodiments of the present systems and methods. In such an example, if the facility provides commissary through a point-of-sale (POS) "window operation" (109), the mail message may be printed at that location and distributed to the residents serviced by that window, at 110. Alternatively, printing of the digital format mail item for distribution within the controlled-environment facility may be carried out by printing the digital format mail item at a printing station located in the controlled-environment facility in close proximity to resident housing, meal, recreation, and/or common areas of the controlled-environment facility at 111. As a further alternative, at 112, printing the digital format mail item for distribution within the controlled-environment facility may be carried out through printing of the digital format mail item at a self-service printing station kiosk operated by the resident of the controlled-environment facility. Regardless, notifications may be provided to a resident that he should pickup mail at a POS location, or otherwise retrieve mail at a printing station or the like. Such notifications might be triggered when the receiving resident accesses a kiosk, uses his or her media device adapted or approved for use in the controlled-environment facility, accesses a resident telephone system, or the like. Alternatively, or additionally other resident information dissemination systems may be used to distribute such notifications such as a streaming banner board, or the like. This notification may indicate that the resident should pick up his or her mail at a predetermined distribution point, such as the POS location. A mechanism to prevent unauthorized access to the resident mail may also be included in such embodiments. For example, the resident could be required to enter a pin code or swipe an ID to cause mail to print. In various correctional facility embodiments, an identification bracelet, which may include an RFID chip, barcode, and/or the like, may be scanned/read to enable printing. Such identification requirements prior to printing may enable prevention of window workers from printing and reading mail prior to a resident/inmate receiving it. Alternatively or additionally, a controlled-environment facility officer may be afforded an opportunity to print the digital format mail item, such as for delivery to the resident, for evidence, other investigative purposes, or the like.

If the facility provides commissary via a "bag and deliver" operation (113), the mail may be integrated into the commissary order for each individual resident, to provide a commissary order and inbound mail package for each resident, in accordance with embodiments of the present systems and methods. In such embodiments, printing of a particular resident's mail may occur as part of a commissary order fulfillment process at 114. For example, a barcode scanner connected to a printer may read a barcode (e.g. a resident identification barcode, or the like) on an order form for a current order being filled, at 114, prompting retrieval and printing of the mail message. A mechanism and/or process may be employed to insure that mail cannot be read by order fulfillment workers in certain embodiments. For example, the printer may generate a sealed document, a coversheet, or the like. Regardless, the mail message is included in the resident's commissary order at 115.

If resident mail remains after filing of commissary orders, a determination may be made at 116 that ensures or confirms that the recipient resident has no commissary order, whereupon mail may be printed at the facility at 117 for optimal distribution, by the facility, by commissary workers, or the like. Alternatively, if resident mail remains after filing of commissary orders and it is confirmed the recipient resident has no commissary order an (empty) "commissary order" may be created at 118 that consists solely of the resident's mail items for delivery, alongside other commissary orders for other residents.

When thus integrated with a commissary distribution network, embodiments of the present systems and methods may print mail messages at the same time as commissary receipts, avoiding significant additional work for commissary company workers whether at POS window operation 109 or in a bag and deliver operation 113. Hence, an existing commissary distribution network, or the like may be leveraged to also include mail items and thereby eliminate, or at least greatly reduce, the need for costly mail processing at the facility.

In accordance with embodiments of the present systems and methods, a delivery receipt may be generated when the resident receives the mail correspondence, such as through the email system of the like which delivers the electronic message in electronic delivery embodiments, or upon printing of the mail message at a POS delivered physical delivery embodiment, or as part of a delivery confirmation process in a package delivery embodiment. Also, in accordance with both electronic delivery embodiments and physical delivery embodiments, the present systems and methods may be capable of tracking when a resident receives a mail message, while electronic embodiments may be further capable of tracking when the resident reads the message.

In accordance with some embodiments of the present systems and methods a website may provide tracking of delivery status of mail items, and/or the like. That is, the status of delivery of a mail item can be tracked on a website by a family member, officer, or the resident. For example, the family member mails the correspondence but may then have no idea if it has been received by the facility or lost, whether the resident eventual received the mail item, or the like. A website provided in accordance with embodiments of the present systems and methods may allow such family to enter their name, or some other identifier associated with their particular mail message, and they may be presented a status such as "unreceived," "scanned," "sent to resident," "read by resident," or similar.

Advantageously, implementation of embodiments of the present systems and methods may provide aggregation and reconciliation of physical and electronic mail and result in all electronic and physical mail being handled in a consistent manner and archived together allowing investigations to be done with ease, etc. Further, embodiments of the present systems and methods help to eliminate physical contraband and biohazard from entering the facility via mail since the original mail items never reach the resident.

Figure 2:
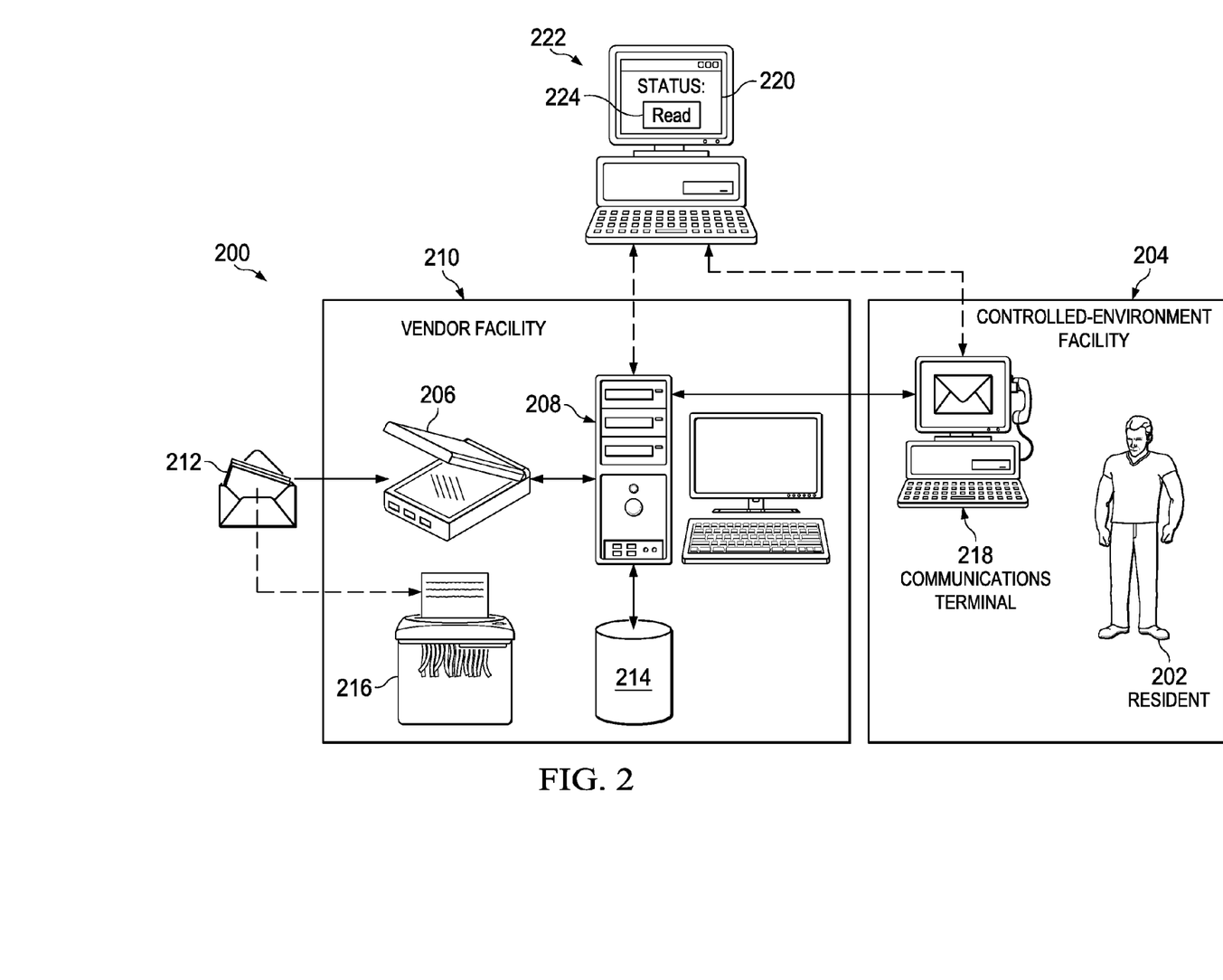
FIG. 2 is a diagrammatic illustration showing an example flow of mail in accordance with some embodiments.

FIG. 2 is a diagrammatic illustration showing an example flow of mail in accordance with some embodiments. Therein, system 200 for delivery of mail to resident 202 of controlled-environment facility 204 includes imaging device 206 operatively coupled to computer system 208. Imaging device 206 and/or computer 208 may or may not be co-located within controlled-environment facility 204. For example, imaging device 206 and computer 208 are illustrated in FIG. 2, outside of controlled-environment facility 204, at a vendor facility, 210. Computer system 208 may include at least one processor and a memory coupled to the at least one processor, the memory configured to store program instructions executable by the at least one processor to cause the system to carry out a number of operations. For example, physical mail items 212 may be imaged using imaging device 206 to provide corresponding digital format mail items and each digital format mail item may be associated with a controlled-environment facility resident that the item is addressed to. A copy of each so associated digital format mail item may be archived, such as on database 214, along with other information such as discussed above including statistics related to the mail item, the name of an operator who scanned the mail item, a scan of the physical mail item envelope, and/or the like.

Computer system 208 may, in accordance with various embodiments of the present systems and methods, determine whether the resident (202) that physical mail item 212 is addressed to is allowed to receive the physical mail item. For example, as discussed above, the digital rendering may be subjected to the facility's approval process, wherein a determination may be made whether the resident is allowed to receive correspondence at all, whether the resident is allowed to receive the particular correspondence from the individual who sent it, a disciplinary status of the resident, and/or the like. This determination whether the resident is allowed to receive the physical mail item may include determining an identity of a sender of the physical mail item using character recognition (such as on the digital mail item and/or envelope), comparing the identity of the sender to a list of approved contacts for the resident, and only delivering the digital format mail item upon determination that the resident is allowed to receive communications from the sender. Also in this regard, the digital format mail item may be (automatically) translated into another language and a resulting translated digital format mail item may be checked against keywords in the other language. Additionally or alternatively, an officer may be required to review and approve the digital format mail item before the resident is allowed to view the digital format mail item.

In accordance with various embodiments of the present systems and methods, if a determination is made, such as by computer system 208 that resident 202 is not allowed to receive physical mail item 212, computer system 208 may apply controlled-environment facility policy and/or procedures to the digital format mail item and/or the physical mail item. Such application of controlled-environment facility policy and/or procedures to the digital format mail item may call for archiving the format mail item, such as to database 214, for later distribution to resident 202, such as following the end of any applicable resident disciplinary period, upon the resident's release from the controlled-environment facility, or at other such time. Alternatively, such application of policy and/or procedures to the digital format mail item may call for deleting the digital format mail item and/or destroying physical mail item 212, such as by shredding it in shredder 216, recycling, burning, etc. However, if it is determined that resident 202 is allowed to receive physical mail item 212, it may be delivered to the resident.

That is, if, as in system 200 illustrated in FIG. 2, an electronic message service is available to resident 202, the digital format mail item may then be delivered to the resident (202) it is addressed to as an electronic message in response to a determination that the resident is allowed to receive physical mail item 212, such as via a controlled-environment facility computer terminal, communications terminal 218, resident digital media device, or the like, capable of receiving the electronic message.

As discussed above, and shown in FIG. 2, delivery of the digital format mail item to the resident may be provided from centralized server 210, outside of controlled-environment facility 204. That is, the digital format mail items may be displayed on communications terminal 218, a resident tablet device, or the like, to the resident, from computer system 208 (e.g. a centralized server), which is not located within the controlled-environment facility 204.

A date and time the digital format mail item is viewed by the resident, and/or the like, may be recorded in some embodiments, such as in database 214, by computer system 208, for potential investigative, and/or quality control purposes, and/or the like. In furtherance of such embodiments, or the like, the digital format mail item may be encrypted, by computer system 208, prior to delivery, whereby, a viewer's identity used to decrypt the item (on communication terminal 218, for example) and the date and/or the time of each decryption and viewing of the digital format mail item may be recorded in database 214, or the like, for later potential investigative purposes, confirmation of delivery, etc.

In accordance with some embodiments of the present systems and methods website 220 may be provided using information from computer system 208 and/or communications terminal 218 (and/or aforementioned resident tablet device, or the like) for tracking of delivery status of mail items on an outside device (such as illustrated non-resident computer 222, communications terminal 218, a tablet device, smartphone, or the like). In such embodiments, the status of delivery of a mail item can be tracked on a website by a family member, officer, or the resident. For example, a family member who has mailed correspondence, but has no idea if it has been received by the facility, whether the resident eventual received the mail item, etc. may use the website to enter their name or some other identifier associated with their particular mail message and may be presented status 224 such as "unreceived," "scanned," "sent to resident," "read by resident," or the like. Similarly, resident 202 may be able to track receipt and review of mail items using terminal 218 (and/or their tablet device). Also, facility personnel may use communications terminal 218, a facility administration system, or the like to track processing, receipt and review of mail items.

Figure 3:
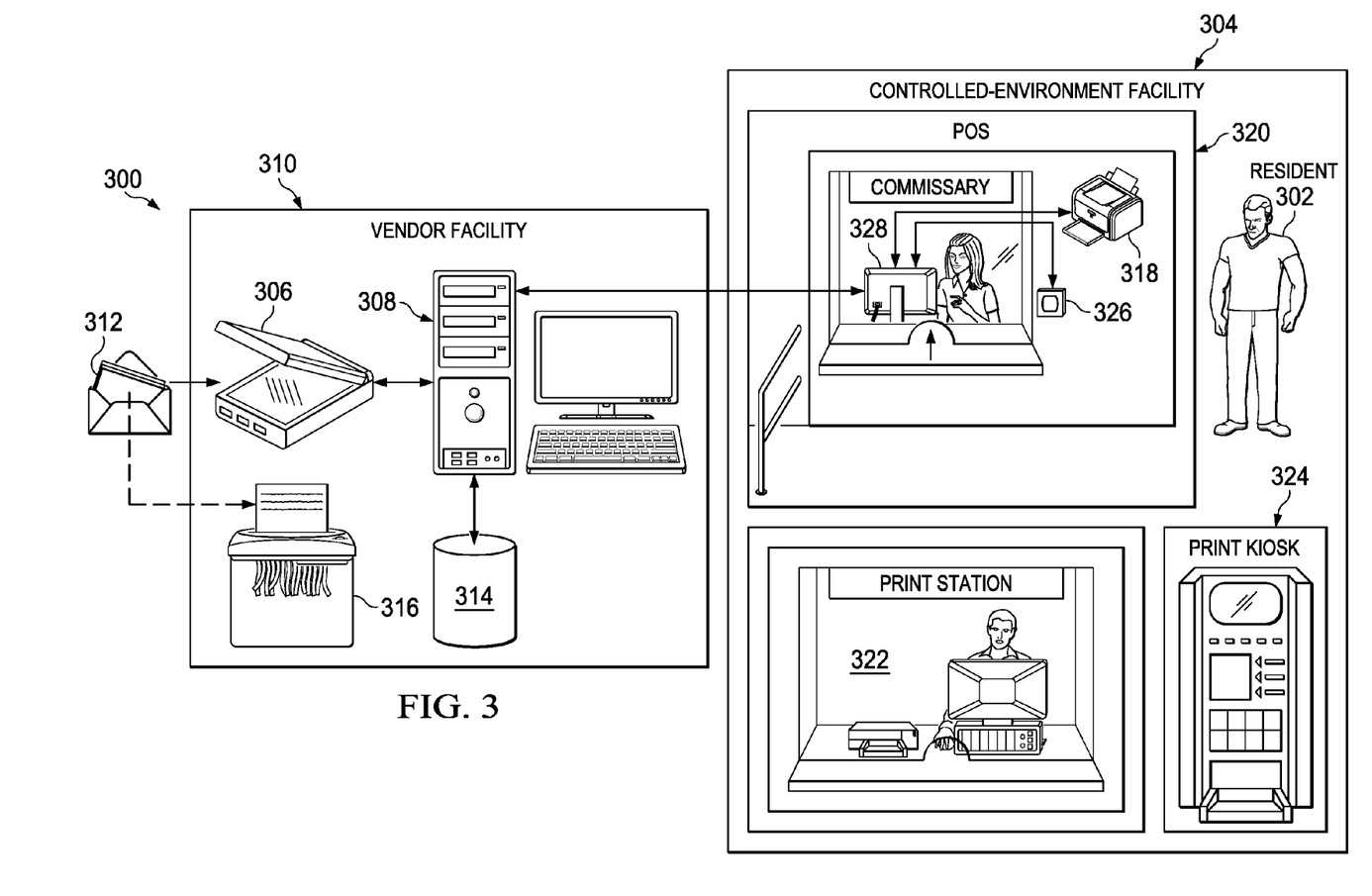
FIG. 3 is a diagrammatic illustration showing another example flow of mail in accordance with some other embodiments.

FIG. 3 is a diagrammatic illustration showing an example flow of mail in accordance with some other embodiments. Therein, system 300 for delivery of mail to resident 302 of controlled-environment facility 304 includes, similar to system 200 described above, imaging device 306 operatively coupled to computer system 308. Imaging device 306 and/or computer 308 may or may not be co-located within controlled-environment facility 304. Imaging device 306 and computer 308 are, by way of example, illustrated in FIG. 3 as being outside of controlled-environment facility 304, at vendor facility 310. Again, computer system 308 may include at least one processor and a memory coupled to the at least one processor, the memory configured to store program instructions executable by the at least one processor to cause the system to carry out a number of operations. To wit, physical mail items 312 may be imaged using imaging device 306 to provide corresponding digital format mail items and each digital format mail item may be associated with a controlled-environment facility resident that the item is addressed to. A copy of each so associated digital format mail item may be archived, such as to database 314.

Computer system 308 may, in accordance with such embodiments of the present systems and methods, determine whether resident 302, whom physical mail item 312 is addressed to, is allowed to receive the physical mail item. In accordance with various embodiments of the present systems and methods, if a determination is made, such as by computer system 308 that resident 302 is not allowed to receive physical mail item 312, computer system 308 may apply controlled-environment facility policy and/or procedures to the digital format mail item and/or the physical mail item. For example, the digital format mail item may be archived, such as to database 314, for later distribution to resident 302, such as following the end of any applicable resident disciplinary period, upon the resident's release from the controlled-environment facility, or at other such time. Alternatively, such application of policy and/or procedures to the digital format mail item may call for deleting the digital format mail item and/or destroying physical mail item 312, such as by shredding it in shredder 316, recycling, burning, etc.

However, if it is determined that resident 302 is allowed to receive physical mail item 312, it is delivered to the resident. If an electronic message service is not available to the resident, as is often the case, means for printing the digital format mail item for distribution or otherwise providing the printed digital mail item to the receiving resident may be provided. For example, delivery to the resident via a commissary provisioning system may be provided in accordance with embodiments of the present systems and methods, consistent with system 300 illustrated in FIG. 3. The means for printing the digital format mail item may take the form of printer 318, or the like, disposed at a commissary POS 320 located within or in conjunction with controlled-environment facility 304. This POS may take the form of a walk-up window (as illustrated), a kiosk, a store, a vending machine, or the like, located within, or in conjunction with controlled environment facility 304 (such as immediately adjacent to controlled-environment facility 304). Alternatively (or additionally), a means for printing and distributing the digital format mail item may take the form of printing station 322 located in close proximity to resident housing, meal, recreation, common areas and/or the like. As a further alternative (or additional means) for printing and distributing the digital format mail item a self-service printing station kiosk 324, such as may be operated by resident 302 of controlled-environment facility 304, may be employed.

POS 320 and/or printing stations/kiosks 322 and/or 324 may employ a means for scanning identification of resident 302 to print the digital format mail item for delivery to the resident. By way of example, such a scanner (326) may take the form of a RIFD scanner to scan an RIFD bracelet worn by resident 302, an optical scanner or reader (i.e. a bar code reader) to scan a barcode such as may be worn by the resident on a bracelet or clothing, a biometric scanner such as a fingerprint reader, or other identification device, any of which may be couple to the respective printer, such as shown with respect to printer 318, via POS terminal/computer system 328.

Figure 4:
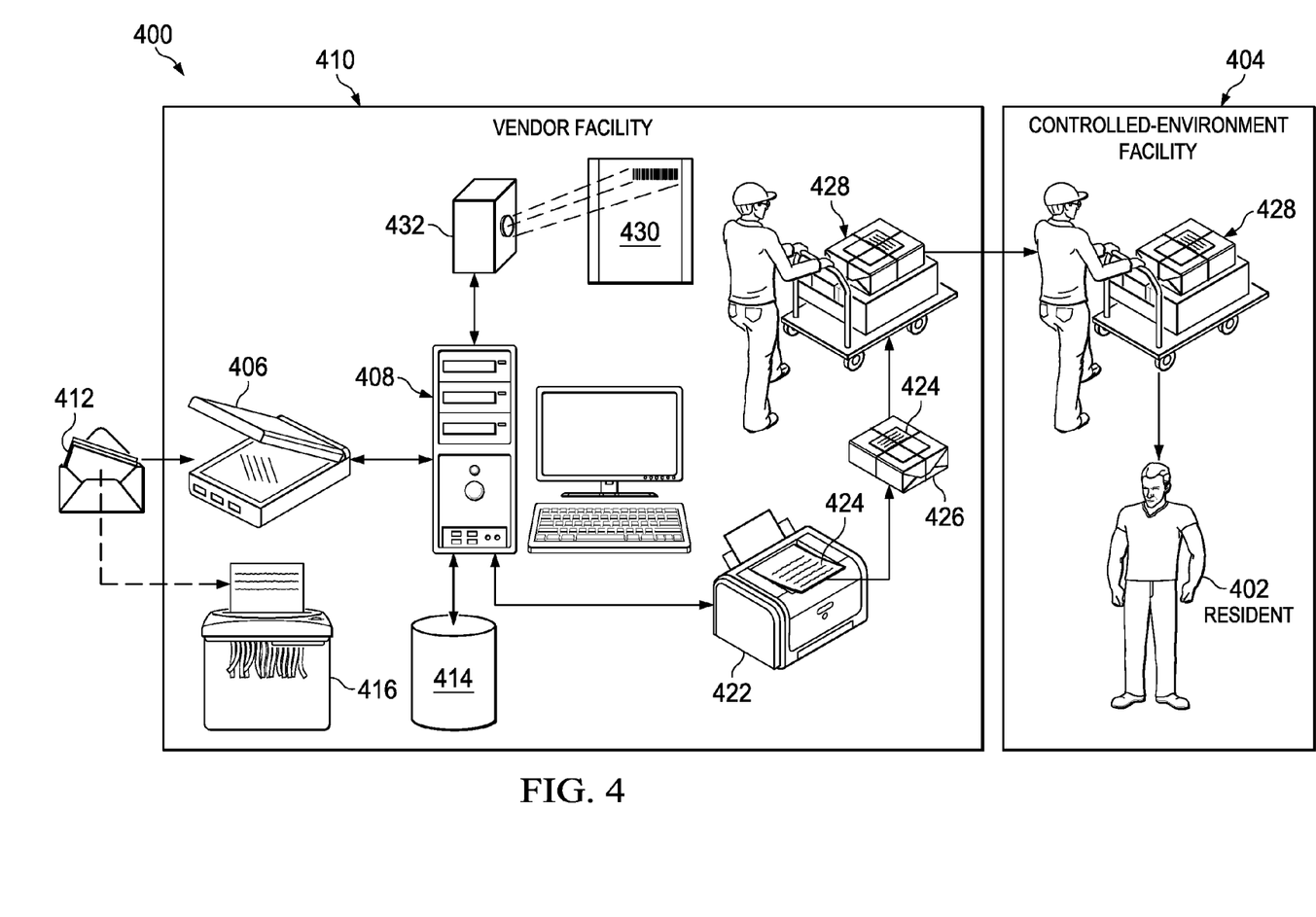
FIG. 4 is a diagrammatic illustration showing another example flow of mail in accordance with further embodiments.

FIG. 4 is a diagrammatic illustration showing an example flow of mail in accordance with further embodiments. Therein, system 400 for delivery of mail to resident 402 of controlled-environment facility 404 includes, similar to systems 200 and 300 described above, imaging device 406 operatively coupled to computer system 408. Imaging device 406 and/or computer 408 may or may not be co-located within controlled-environment facility 404. Imaging device 406 and computer 408 are illustrated in FIG. 4, outside of controlled-environment facility, at vendor facility 410. Computer system 408 may include at least one processor and a memory coupled to the at least one processor, the memory configured to store program instructions executable by the at least one processor to cause the system to carry out a number of operations. For example, physical mail items 412 may be imaged using imaging device 406 to provide corresponding digital format mail items and each digital format mail item may be associated with a controlled-environment facility resident that the item is addressed to. A copy of each digital format mail item may be archived, such as on database 414, associated with the resident it is addressed to.

Computer system 408 may, in accordance with various embodiments of the present systems and methods, determine whether resident 402, the resident physical mail item 412 is addressed to, is allowed to receive the physical mail item. In accordance with various embodiments of the present systems and methods, if a determination is made, such as by computer system 408 that resident 402 is not allowed to receive physical mail item 412, computer system 408 may apply controlled-environment facility policy and/or procedures to the digital format mail item and/or the physical mail item. Such application of controlled-environment facility policy and/or procedures to the digital format mail item may call for archiving the format mail item, such as to database 414, for later distribution to resident 402, such as following the end of any applicable resident disciplinary period, upon the resident's release from the controlled-environment facility, or at other such time. Alternatively, such application of policy and/or procedures to the digital format mail item may call for deleting the digital format mail item and/or destroying physical mail item 412, such as by shredding it in shredder 416, recycling, burning, etc.

However, if it is determined that resident 402 is allowed to receive physical mail item 412, it is delivered to the resident. If, as is often the case, an electronic message service is not available to the resident, the digital format mail item may be printed and delivered to the resident via a commissary bag and deliver arrangement in accordance with embodiments of the present systems and methods, as illustrated in FIG. 4.

The means for printing the digital format mail item may take the form of printer 422, or the like in communication with computer system 408, such as may be disposed at vendor location 410. The digital format mail item is printed on printer 422 and the resulting printed mail item 424 is included in commissary order 426 for resident 402 for delivery (428) to resident 402 in/at controlled-environment facility 404. In accordance with various embodiments of the present systems and methods, printing of the digital format mail item may be carried-out in response to scanning of commissary order form 430 of resident 402, such as scanning of a barcode, or the like, on order form 430, using an appropriate scanner, such as bar code scanner 432, in communication with, by way of example, computer system 408, or the like.

Figure 5:
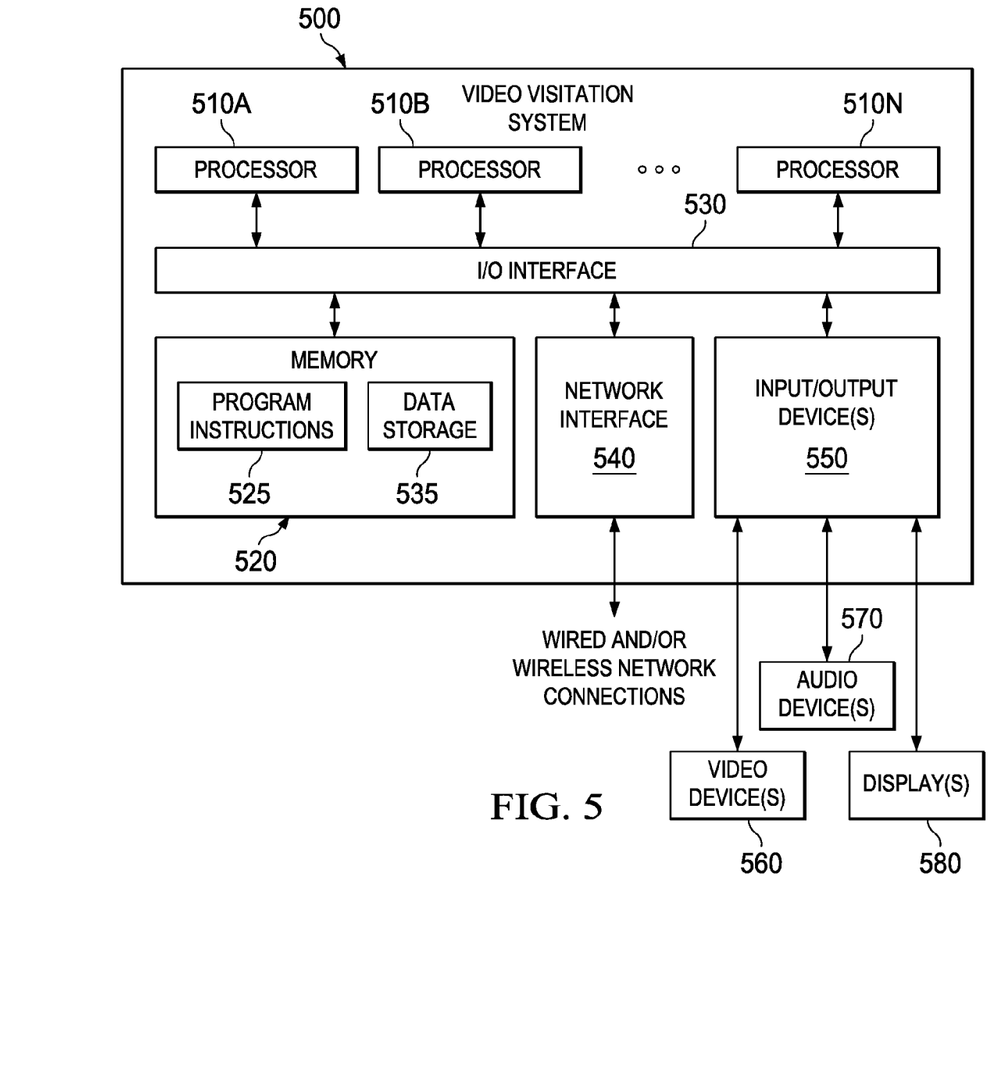
FIG. 5 is a block diagram of a computer system, device, or station configured to implement various techniques disclosed herein according to some embodiments.

Embodiments of the present systems and methods for mail processing and delivery via controlled-environment facility commissary networks, as described herein, may be implemented or executed, at least in part, by one or more computer systems. One such computer system is illustrated in FIG. 5. In various embodiments, computer system or station 500 may be a server, a mainframe computer system, a workstation, a network computer, a desktop computer, a laptop, or the like. For example, in some cases, computer 500 may implement one or more steps of example procedure 100 described above, and/or a computer system such as computer system 500 may be used as, or as part of, one or more of: computer systems 208, 308 and/or 408; communications terminal 218; non-resident device 222; and/or POS terminal/computer system 326. In various embodiments two or more of these computer systems may be configured to communicate with each other in any suitable way, such as, for example, via a network (e.g., in FIG. 2 computer system 208 may be networked with communications terminal 218, via the Internet, a private network, or the like, while computer system 208 and/or communications terminal 218 may be networked with non-resident device 222, via the Internet, a private network, or the like).

As illustrated, example computer system 500 includes one or more processors 510 coupled to a system memory 520 via an input/output (I/O) interface 530. Example computer system 500 further includes a network interface 540 coupled to I/O interface 530, and one or more input/output devices 550, such as video device(s) 560 (e.g., a camera), audio device(s) 570 (e.g., a microphone and/or a speaker), and display(s) 580. Computer system 500 may also include a cursor control device (e.g., a mouse or touchpad), a keyboard, etc. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In various embodiments, computer system 500 may be a single-processor system including one processor 510, or a multi-processor system including two or more processors 510 (e.g., two, four, eight, or another suitable number). Processors 510 may be any processor capable of executing program instructions. For example, in various embodiments, processors 510 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 510 may commonly, but not necessarily, implement the same ISA. Also, in some embodiments, at least one processor 510 may be a graphics processing unit (GPU) or other dedicated graphics-rendering device.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 4, may be stored within system memory 520 as program instructions 525 and data storage 535, respectively. In other embodiments, program instructions and/or data may be received, sent or stored upon different types of computer-accessible media or on similar media separate from system memory 520 or computer system 500. Generally speaking, a computer-readable medium may include any tangible or non-transitory storage media or memory media such as magnetic or optical media—e.g., disk or CD/DVD-ROM coupled to computer system 500 via I/O interface 530, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 540.

In an embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any suitable protocol, timing or other data transformations to convert data signals from one component (e.g., system memory 520) into a format usable by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments, some or all of the functionality of I/O interface 530, such as an interface to system memory 520, may be incorporated into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 5, memory 520 may include program instructions 525, configured to implement certain embodiments described herein, and data storage 535, comprising various data accessible by program instructions 525. In an embodiment, program instructions 525 may include software elements corresponding to one or more of the various embodiments illustrated in the above figures. For example, program instructions 525 may be implemented in various embodiments using any desired programming language, scripting language, or combination of programming languages and/or scripting languages (e.g., C, C++, C#, JAVA®, JAVASCRIPT®, PERL®, etc.). Data storage 535 may include data that may be used in these embodiments. In other embodiments, other or different software elements and data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    converting, by a processor controlled digital imaging device, an incoming physical mail item addressed to a resident of a controlled-environment facility into a digital format mail item;
    associating the digital format mail item with the resident by one or more processor-based computer systems;
    archiving a copy of the digital format mail item, associated with the resident, in an electronic database by the one or more processor-based computer systems;
    determining by the one or more processor-based computer systems, whether an electronic message service is available to the resident;
    determining, by the one or more processor-based computer systems, whether the resident is allowed to receive the physical mail item; and
    delivering the digital format mail item to the resident as an electronic message directed to the resident by the one or more processor-based computer systems, in response to a determination that the resident is allowed to receive the physical mail item, if an electronic message service is available to the resident.

2. The method of claim 1, further comprising presenting the digital format mail item to a controlled-environment facility officer for review and approval before delivering the digital format mail item to the resident as an electronic message.

3. The method of claim 1, further comprising:
    maintaining statistics related to the digital format mail item in the same or another electronic database; and
    making the statistics available for reporting by the one or more processor-based computer systems.

4. The method of claim 1, further comprising automatically translating the digital format mail item into another language and checking a resulting translated digital format mail item against keywords in the other language.

5. The method of claim 1, further comprising, recording, in the same or different electronic database, an identity of a person operating the processor controlled digital imaging device to scan the physical mail item.

6. The method of claim 1, further comprising, recording, in the same or different electronic database, a date and time the digital format mail item is viewed by the inmate.

7. The method of claim 1, wherein determining whether the resident is allowed to receive the physical mail item further comprises:
    determining an identity of a sender of the physical mail item using character recognition;
    comparing the identity of the sender to a list of approved contacts for the resident; and
    delivering the digital format mail item upon determination that the resident is allowed to receive communications from the sender.

8. The method of claim 1, further comprising rescinding delivery of the digital format mail item.

9. The method of claim 1, further comprising:
    encrypting the digital format mail item prior to delivery; and
    recording, in the same or different database, a viewer's identity, date, and time upon each decryption and viewing of the digital format mail item.

10. The method of claim 1, further comprising providing a controlled-environment facility officer an opportunity to print the digital format mail item.

11. The method of claim 1, further comprising:
    converting, by the processor controlled digital imaging device, an envelope of the incoming physical mail item into a digital format; and
    associating the digital format of the envelope with the digital mail item by the one or more processor-based computer systems.

12. The method of claim 1, wherein delivering the digital format mail item to the resident comprises providing the electronic message directed to the resident from a centralized server outside of the controlled-environment facility.

13. The method of claim 1, further comprising providing a website providing tracking of delivery status of mail items.

14. A system for delivery of mail to a resident of a controlled-environment facility comprising:
    an imaging device operatively coupled to a computer system;
    the computer system comprising:
    at least one processor; and
    a memory coupled to the at least one processor, the memory configured to store program instructions executable by the at least one processor to cause the system to:
    image each physical mail item using the imaging device to provide corresponding digital format mail items;
    associate each digital format mail item with a controlled-environment facility resident the item is addressed to;
    archive a copy of each digital format mail item to an electronic database associated with the computer system;
    determine whether a resident the physical mail item is addressed to is allowed to receive the physical mail item; and
    deliver each digital format mail item to the resident it is addressed to as an electronic message in response to a determination that the resident is allowed to receive the physical mail item, if an electronic message service is available to the resident.

15. The system of claim 14, wherein the program instructions are further executable by the at least one processor to cause the system to present the digital format mail item to a controlled-environment facility officer for review and approval before delivering the digital format mail item to the resident as an electronic message.

16. The system of claim 14, wherein the program instructions are further executable by the at least one processor to cause the system to:
    maintain statistics related to the digital format mail item in the same or another electronic database; and
    make the statistics available for reporting.

17. The system of claim 14, wherein the program instructions are further executable by the at least one processor to cause the system to automatically translate the digital format mail item into another language and check a resulting translated digital format mail item against keywords in the other language.

18. The system of claim 14, wherein the program instructions are further executable by the at least one processor to cause the system to record, in the same or different electronic database, an identity of a person operating the imaging device to scan the physical mail item.

19. The system of claim 14, wherein the program instructions are further executable by the at least one processor to cause the system to record, in the same or different electronic database, a date and time the digital format mail item is viewed by the inmate.

20. The system of claim 14, wherein determining whether a resident the physical mail item is addressed to is allowed to receive the physical mail item further comprises the system:
  determining an identity of a sender of the physical mail item using character recognition;
  comparing the identity of the sender to a list of approved contacts for the resident; and
  delivering the digital format mail item upon determination that the resident is allowed to receive communications from the sender.

21. The system of claim 14, wherein the program instructions are further executable by the at least one processor to cause the system to rescind delivery of the digital format mail item.

22. The system of claim 14, wherein the program instructions are further executable by the at least one processor to cause the system to:
  encrypt the digital format mail item prior to delivery; and
  record, in the same or different database, a viewer's identity, date, and time upon each decryption and viewing of the digital format mail item.

23. The system of claim 14, wherein the program instructions are further executable by the at least one processor to cause the system to provide a controlled-environment facility officer an opportunity to print the digital format mail item.

24. The system of claim 14, wherein the program instructions are further executable by the at least one processor to cause the system to:
  convert an envelope of the incoming physical mail item into a digital format; and
  associate the digital format of the envelope with the digital mail item in the same or a different electronic database.

25. The system of claim 14, wherein the computer system is a centralized server outside of the controlled-environment facility.

26. The system of claim 14, wherein the program instructions are further executable by the at least one processor to cause the system to provide a website providing tracking of delivery status of mail items.

27. A non-transitory computer-readable storage medium having program instructions stored thereon that, upon execution by one or more computer systems, cause the one or more computer systems to:
  convert, by a processor controlled digital imaging device, an incoming physical mail item addressed to a resident of a controlled-environment facility to a digital format mail item;
  associate the digital format mail item with the resident;
  archive a copy of the digital format mail item, associated with the resident, in an electronic database;
  determine whether the resident is allowed to receive the physical mail item;
  determine whether an electronic message service is available to the resident; and
  deliver the digital format mail item to the resident as an electronic message directed to the resident in response to a determination that the resident is allowed to receive the physical mail item, if an electronic message service is available to the resident.

28. The non-transitory computer-readable storage medium of claim 27, wherein the program instructions stored thereon cause the one or more computer systems to present the digital format mail item to a controlled-environment facility officer for review and approval before delivering the digital format mail item to the resident as an electronic message.

29. The non-transitory computer-readable storage medium of claim 27, wherein the program instructions stored thereon cause the one or more computer systems to:
  maintain statistics related to the digital format mail item in the same or another electronic database; and
  make the statistics available for reporting.

30. The non-transitory computer-readable storage medium of claim 27, wherein the program instructions stored thereon cause the one or more computer systems to automatically translate the digital format mail item into another language and check a resulting translated digital format mail item against keywords in the other language.

31. The non-transitory computer-readable storage medium of claim 27, wherein the program instructions stored thereon cause the one or more computer systems to record, in the same or different electronic database, an identity of a person operating the imaging device to scan the physical mail item.

32. The non-transitory computer-readable storage medium of claim 27, wherein the program instructions stored thereon cause the one or more computer systems to record, in the same or different electronic database, a date and time the digital format mail item is viewed by the inmate.

33. The non-transitory computer-readable storage medium of claim 27, wherein the program instructions stored thereon cause the one or more computer systems to determine whether the resident is allowed to receive the physical mail item by:
  determining an identity of a sender of the physical mail item using character recognition;
  comparing the identity of the sender to a list of approved contacts for the resident; and
  delivering the digital format mail item upon determination that the resident is allowed to receive communications from the sender.

34. The non-transitory computer-readable storage medium of claim 27,
  wherein the program instructions stored thereon cause the one or more computer systems to rescind delivery of the digital format mail item.

35. The non-transitory computer-readable storage medium of claim 27, wherein the program instructions stored thereon cause the one or more computer systems to:
  encrypt the digital format mail item prior to delivery; and
  record, in the same or different database, a viewer's identity, date, and time upon each decryption and viewing of the digital format mail item.

36. The non-transitory computer-readable storage medium of claim 27, wherein the program instructions stored thereon cause the one or more computer systems to provide a controlled-environment facility officer an opportunity to print the digital format mail item.

37. The non-transitory computer-readable storage medium of claim 27, wherein the program instructions stored thereon cause the one or more computer systems to:
   convert an envelope of the incoming physical mail item into a digital format; and
   associate the digital format of the envelope with the digital mail item in the same or a different electronic database.

38. The non-transitory computer-readable storage medium of claim 27, wherein the one or more computer systems that provide the electronic message to the resident is a centralized server outside of the controlled-environment facility.

39. The non-transitory computer-readable storage medium of claim 27, wherein the program instructions stored thereon cause the one or more computer systems to provide a website providing tracking of delivery status of mail items.

\* \* \* \* \*